(No Model.)
W. A. McGUIRE & M. G. HUBBARD, Jr.
PIVOTAL CAR TRUCK.
No. 573,029. Patented Dec. 15, 1896.
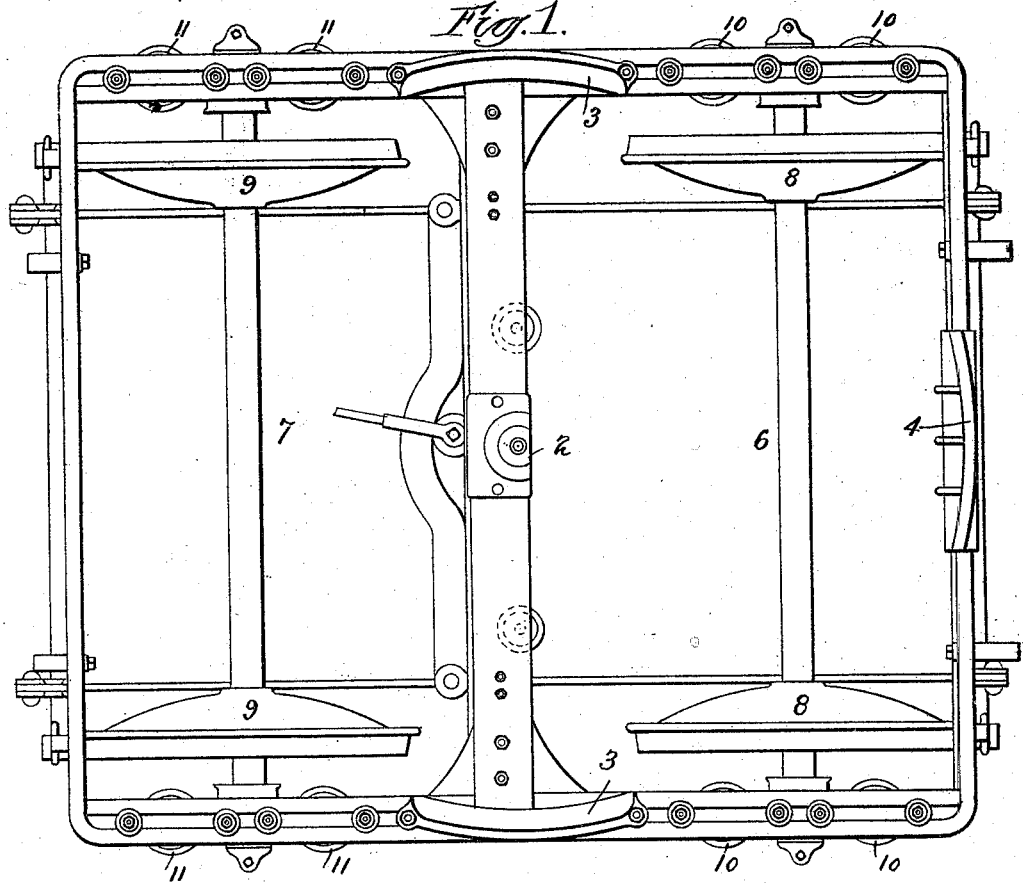
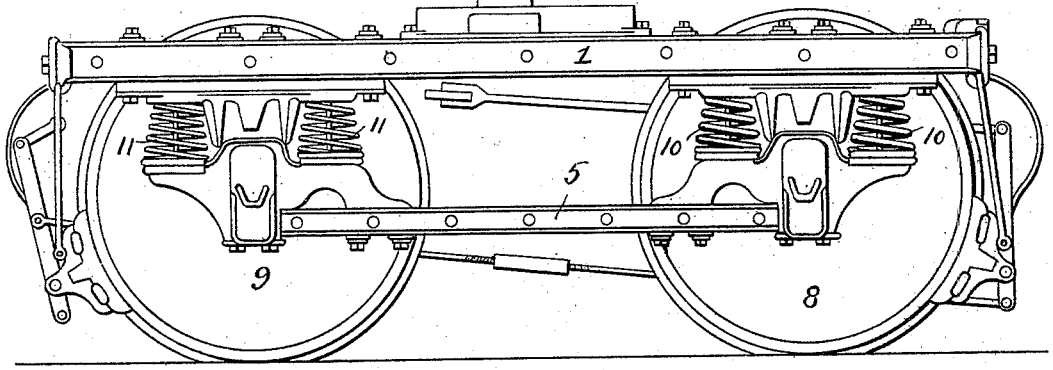
Witnesses
Inventors
William A. McGuire
Moses G. Hubbard Jr.

UNITED STATES PATENT OFFICE.

WILLIAM A. McGUIRE AND MOSES G. HUBBARD, JR., OF CHICAGO, ILLINOIS, ASSIGNORS TO THE McGUIRE MANUFACTURING COMPANY, OF SAME PLACE.

PIVOTAL CAR-TRUCK.

SPECIFICATION forming part of Letters Patent No. 573,029, dated December 15, 1896.

Application filed June 6, 1895. Serial No. 551,840. (No model.)

*To all whom it may concern:*

Be it known that we, WILLIAM A. MCGUIRE and MOSES G. HUBBARD, Jr., citizens of the United States, residing at Chicago, in the county of Cook and State of Illinois, have invented certain new and useful Improvements in Pivotal Car-Trucks, of which the following is a specification, reference being had to the accompanying drawings, in which—

Figure 1 is a top or plan view of a four-wheeled truck, and Fig. 2 is a side elevation of the truck.

Our invention relates to improvements in pivotal motor-trucks; and it consists of an improved construction and arrangement whereby the load on the motor or driving wheels may be increased and a maximum amount of traction obtained, whereby the proportion of load borne by said wheels may be distributed as may be desired, so that a given proportion of the load may be brought upon the motor-wheels and a given proportion upon the idle or guiding wheels. In pivotal trucks for motor-cars where a motor is mounted on each truck and connected with one axle thereof the ordinary construction is such that the load is equally, or nearly equally, distributed upon both axles. This construction is objectionable, because the traction is not sufficient to start the car quickly or to enable it to climb grades when the rails of the track are what is known as "gummy" or what is known among railroad men as "greasy," due to the travel and atmospheric conditions. It also causes them to work unsatisfactorily in snow-storms. These difficulties are so great that unless means are devised whereby the greater proportion of the load can be thrown upon the motor-wheels four-wheeled swiveled truck-cars have been considered impracticable for motor service. It is the object of our invention to provide means for overcoming these difficulties and to provide a wheeled motor-truck pivoted to the car in which, as was said above, any given proportion of the load may be placed upon the motor-wheels, thereby causing them to bear the greater portion of the load and overcoming the difficulties above narrated. We accomplish this object as hereinafter specified and as illustrated in the drawings.

That which we regard as our invention will be set forth in the claims.

In the drawings, 1 indicates an upper frame. The upper frame 1 is provided with a centrally-located bolster 2, of the usual form and construction, by means of which the truck is pivotally mounted upon the body of the car.

3 indicates bearings located centrally one upon each side of the upper frame 1 and adapted to bear against the under surface of the car in the usual manner.

4 indicates a bearing which is mounted upon the top of the upper frame 1 upon the end of the frame over the motor or driving wheels and adapted to bear upon the under side of the car, thus causing the car-body when in rest to be supported upon the central bolster 2, the side bearings 3, and the bearing 4.

5 indicates the lower frame, of the usual form and construction, which is mounted upon the journal-boxes of the axles 6 7. The wheels 8, mounted upon the axle 6, are the driving or motor wheels—that is to say, they are the wheels with which the motor, which may be of any form and construction and which is carried by the truck in the usual manner, is connected. The wheels 9, mounted upon the axle 7, are the idle or guiding wheels of the truck.

The truck is supplied with any approved form of brake mechanism, which, being of any approved form and construction, it is not necessary here to describe, as the same does not form any part of the invention described in this application.

10 indicates compression-springs, which are mounted upon the lower frame 5 in the usual manner and, bearing upon said frame and upon the upper frame 1, support the upper frame.

11 indicates compression-springs which are mounted in the same way as the springs 10. The springs 11 are made weaker than the springs 10, and the difference in strength between the springs 10 and the springs 11 will be varied according to the proportion of the load which it is desired that the motor-wheels should bear. For instance, if it is desired that the motor or traction wheels should bear seventy-five per cent. of the load the compression-springs 10 will be made of three times the carrying capacity of the springs 11. This arrangement of these devices produces the following result: By reason of the fact that the car-body is given a double bearing, first, the bearing centrally upon the truck by means of the bolster 2, and, second, a bearing upon the end of the truck over the motor-wheels by means of the bearing 4, the body of the car and the upper portion of the frame will be kept substantially parallel to one another when the end of the car is thrown downward by any jolt or vibration, notwithstanding the fact that the set of springs 10 is of greater load-carrying capacity than the other springs. It will be readily seen, therefore, that this construction permits the retaining of a centrally-bearing bolster pivotally connecting the car-body with the truck and having the ordinary side bearings for supporting the car-body on curves, and at the same time forming a truck by means of which any given proportion of the load may be placed upon the motor or driving wheels, the upper truck-frame being held at all times practically parallel with the car-body and also with the lower frame, upon which the springs are mounted, and the depression of the truck-springs being therefore practically uniform. For instance, if the springs upon the driving or motor wheel end of said truck have a carrying capacity equal to, say, three thousand pounds for each half-inch of depression and the springs at the idle or guide wheel end of said truck have a carrying capacity equal to one thousand pounds for each half-inch of depression, the depression of all of said springs being by said construction made practically uniform, as above described, then the proportion of load on each pair of wheels will be practically the same as the proportion in carrying capacity between the springs mounted, respectively, upon the motor end and upon the idle or guide end of said truck.

We do not wish to confine ourselves to the exact construction of the bearings above shown and described, as it is manifest that other forms of construction can be used without departing from our invention, the essence of which is the providing of such bearings as will cause the upper frame, the car-body, and the lower frame to remain substantially parallel to one another, while springs of greater carrying capacity are used in the motor end than are used upon the idle or guide end of said truck.

That which we claim as our invention, and desire to secure by Letters Patent, is—

1. In a four-wheeled car-truck, the combination with an upper frame and a centrally-located bolster adapted to be pivotally connected with the body of the car, bearings on said upper frame and bolster adapted to bear upon the body of the car and keep said upper frame and car-body substantially parallel, a lower frame, a pair of driving-wheels, and a pair of guiding-wheels journaled in said lower frame, of springs of greater carrying capacity mounted upon said lower frame upon the end carrying the driving-wheels and bearing upon said upper frame, and springs of less carrying capacity mounted upon said lower frame at the end carrying said guiding-wheels and bearing upon said upper frame, substantially as described.

2. A four-wheeled truck for motor-cars having a centrally-located bolster adapted to be pivotally connected with the car-body, bearings on the truck and bolster adapted to hold said truck and car-body substantially parallel to one another, and two sets of springs, one at each end of said truck, of different carrying capacity, and adapted to distribute the load upon the ends of said truck in proportion to the carrying capacity of said springs, substantially as described.

3. In a four-wheeled car-truck, the combination with an upper frame, a centrally-located bolster adapted to be pivotally connected to a car-body, and bearings on said upper frame and bolster, adapted to keep said frame and car-body when mounted thereon in substantially parallel position, of a lower frame, an axle journaled at each end of said lower frame, wheels mounted upon said axles, and two sets of springs of different carrying capacity bearing upon said upper and said lower frames, and adapted to distribute the load upon said axles in proportion to the respective carrying capacity of said springs, substantially as described.

4. In a four-wheeled car-truck, the combination with an upper frame, a centrally-located bolster adapted to be pivotally connected with the car-body, and bearings on said upper frame and bolster adapted to keep said frame when in position substantially parallel with said car-body, of a lower frame, driving axle and wheels journaled at one end of said lower frame, guiding axle and wheels journaled at the other end of said lower frame, and two sets of springs, one set bearing upon said upper and lower frames at the end carrying the driving axle and wheels, and the other bearing upon said lower and upper frames at the end carrying said guiding-wheels, said last-named springs being of less carrying capacity than the springs at the driving-wheel end of said truck, substantially as described.

WILLIAM A. McGUIRE.
MOSES G. HUBBARD, Jr.

Witnesses:
JOHN L. JACKSON,
A. H. ADAMS.